United States Patent
Heo et al.

(10) Patent No.: US 9,823,823 B2
(45) Date of Patent: Nov. 21, 2017

(54) INFORMATION PROCESSING DEVICE AND INFORMATION PROCESSING METHOD

(71) Applicant: NTT DOCOMO, INC., Chiyoda-ku (JP)

(72) Inventors: Yoonok Heo, Chiyoda-ku (JP); Katsuyuki Takama, Chiyoda-ku (JP); Sumin Kwak, Chiyoda-ku (JP); Tsukasa Aoyama, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 71 days.

(21) Appl. No.: 14/777,623

(22) PCT Filed: Jan. 21, 2014

(86) PCT No.: PCT/JP2014/051116
§ 371 (c)(1),
(2) Date: Sep. 16, 2015

(87) PCT Pub. No.: WO2014/148090
PCT Pub. Date: Sep. 25, 2014

(65) Prior Publication Data
US 2016/0291842 A1    Oct. 6, 2016

(30) Foreign Application Priority Data

Mar. 19, 2013    (JP) ................................ 2013-056562

(51) Int. Cl.
*G06F 3/045*    (2006.01)
*G06F 3/041*    (2006.01)
(Continued)

(52) U.S. Cl.
CPC .......... *G06F 3/04842* (2013.01); *G06F 3/044* (2013.01); *G06F 3/0416* (2013.01);
(Continued)

(58) Field of Classification Search
CPC .. G06F 3/0488; G06F 3/04883; G06F 3/0482; G06F 3/04842
See application file for complete search history.

(56) References Cited

U.S. PATENT DOCUMENTS

2010/0026530 A1* 2/2010 Lee ....................... G06F 3/0233
                                                            341/22
2010/0214225 A1* 8/2010 Moosavi ............. G06F 3/03549
                                                            345/167
(Continued)

FOREIGN PATENT DOCUMENTS

EP    2 230 586 A2    9/2010
EP    2 426 581 A2    3/2012
(Continued)

OTHER PUBLICATIONS

International Preliminary Report of Patentability and Written Opinion dated Oct. 1, 2015 in PCT/JP2014/051116 (English translation only).

(Continued)

*Primary Examiner* — Alexander Eisen
*Assistant Examiner* — Nan-Ying Yang
(74) *Attorney, Agent, or Firm* — Oblon, McClelland, Maier & Neustadt, L.L.P.

(57) ABSTRACT

An information processing device includes a touch panel display that displays an object, a contact state detection unit that detects a state of proximity or contact of a finger on the touch panel display, a coordinate detection unit that detects proximity position coordinates on a plane of the touch panel display when the state of proximity of the finger on the touch panel display is detected by the contact state detection unit, and an object selection unit that calculates a direction of movement and a speed of movement of the proximity position coordinates in a plane direction of the touch panel display based on the proximity position coordinates and (Continued)

selects the object displayed at a position corresponding to the direction of movement and the speed of movement.

9 Claims, 8 Drawing Sheets

(51) Int. Cl.
*G06F 3/0484* (2013.01)
*G06F 3/044* (2006.01)
*G06F 3/0488* (2013.01)

(52) U.S. Cl.
CPC .. *G06F 3/0488* (2013.01); *G06F 2203/04101* (2013.01); *G06F 2203/04108* (2013.01)

(56) References Cited

U.S. PATENT DOCUMENTS

| | | | |
|---|---|---|---|
| 2012/0133585 A1* | 5/2012 | Han | G06F 3/017 345/158 |
| 2013/0174067 A1* | 7/2013 | Zhang | G06F 3/0488 715/764 |
| 2013/0222305 A1* | 8/2013 | Kanno | G06F 3/0484 345/173 |

FOREIGN PATENT DOCUMENTS

| | | |
|---|---|---|
| JP | 6 289834 | 10/1994 |
| JP | 2009 70177 | 4/2009 |
| JP | 2010 122972 | 6/2010 |
| JP | 2010 205050 | 9/2010 |
| JP | 2010 224663 | 10/2010 |
| JP | 2011 170834 | 9/2011 |
| JP | 2012 138012 | 7/2012 |
| JP | 2012 252627 | 12/2012 |

OTHER PUBLICATIONS

Extended European Search Report dated Mar. 9, 2016 in Patent Application No. 14768261.1.
International Search Report dated Apr. 8, 2014 in PCT/JP2014/051116 Jan. 21, 2014.
Japanese Office Action dated Jun. 30, 2015 in Application No. JP 2013-056562 Filed Mar. 19, 2013(with English translation).
European Office Action issued in counterpart EP Application No. 14768261.1 dated May 23, 2017, 7 pages.

* cited by examiner

*Fig.3*

| TIME | PROXIMITY POSITION COORDINATES |
|---|---|
| t | x(t), x(t) |
| t+0.1 | x(t+0.1), y(t+0.1) |
| t+0.2 | x(t+0.2), y(t+0.2) |
| t+0.3 | x(t+0.2), y(t+0.3) |
| ⋮ | ⋮ |
| t+Δt | x(t+Δt), y(t+Δt) |

*Fig.4*

| POSITION COORDINATES | OBJECT |
|---|---|
| ⋮ | ⋮ |
| (x1,y1) | A |
| (x2,y2) | B |
| (x3,y3) | C |
| ⋮ | ⋮ |
| (xn,yn) | G |

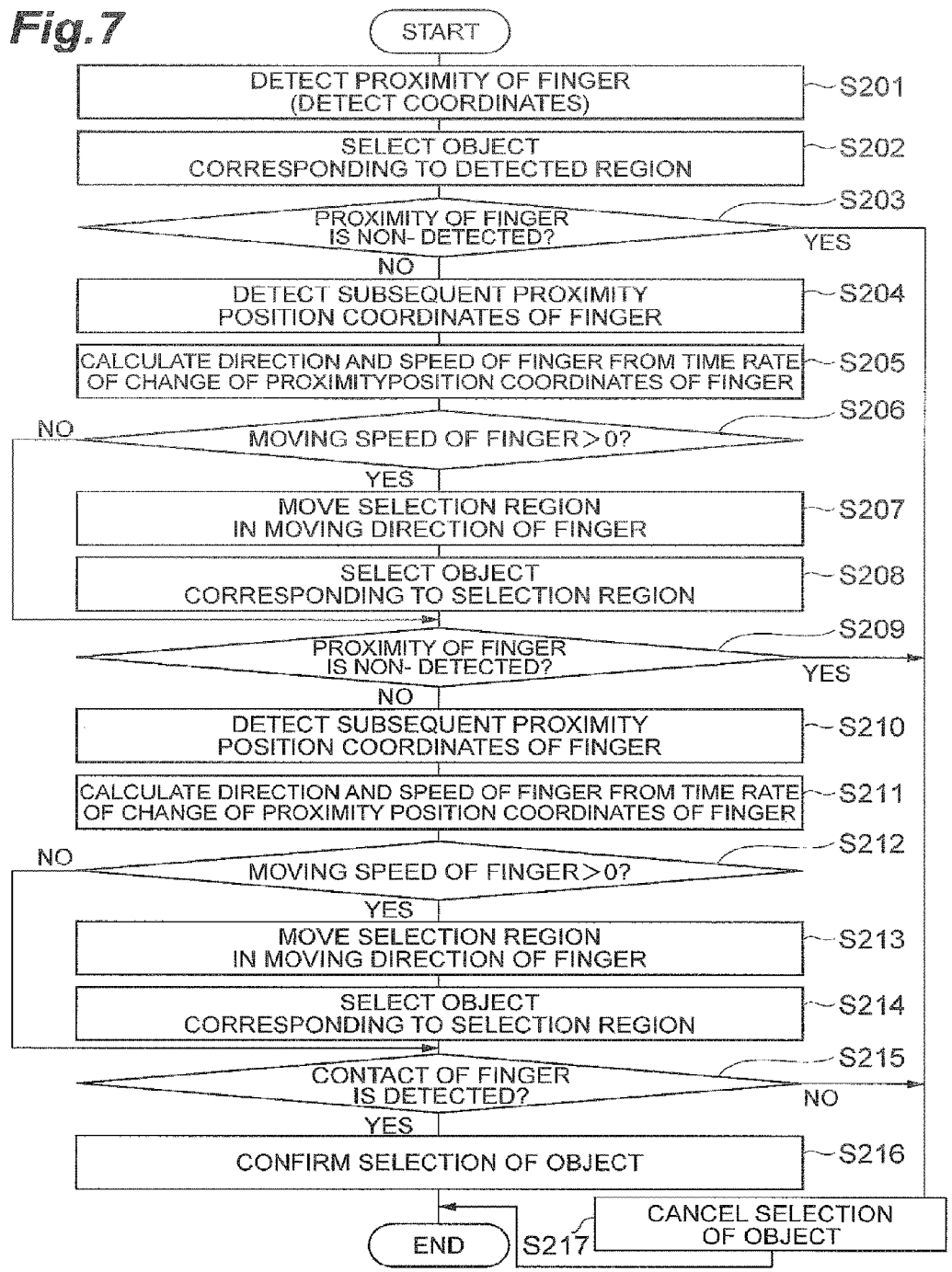

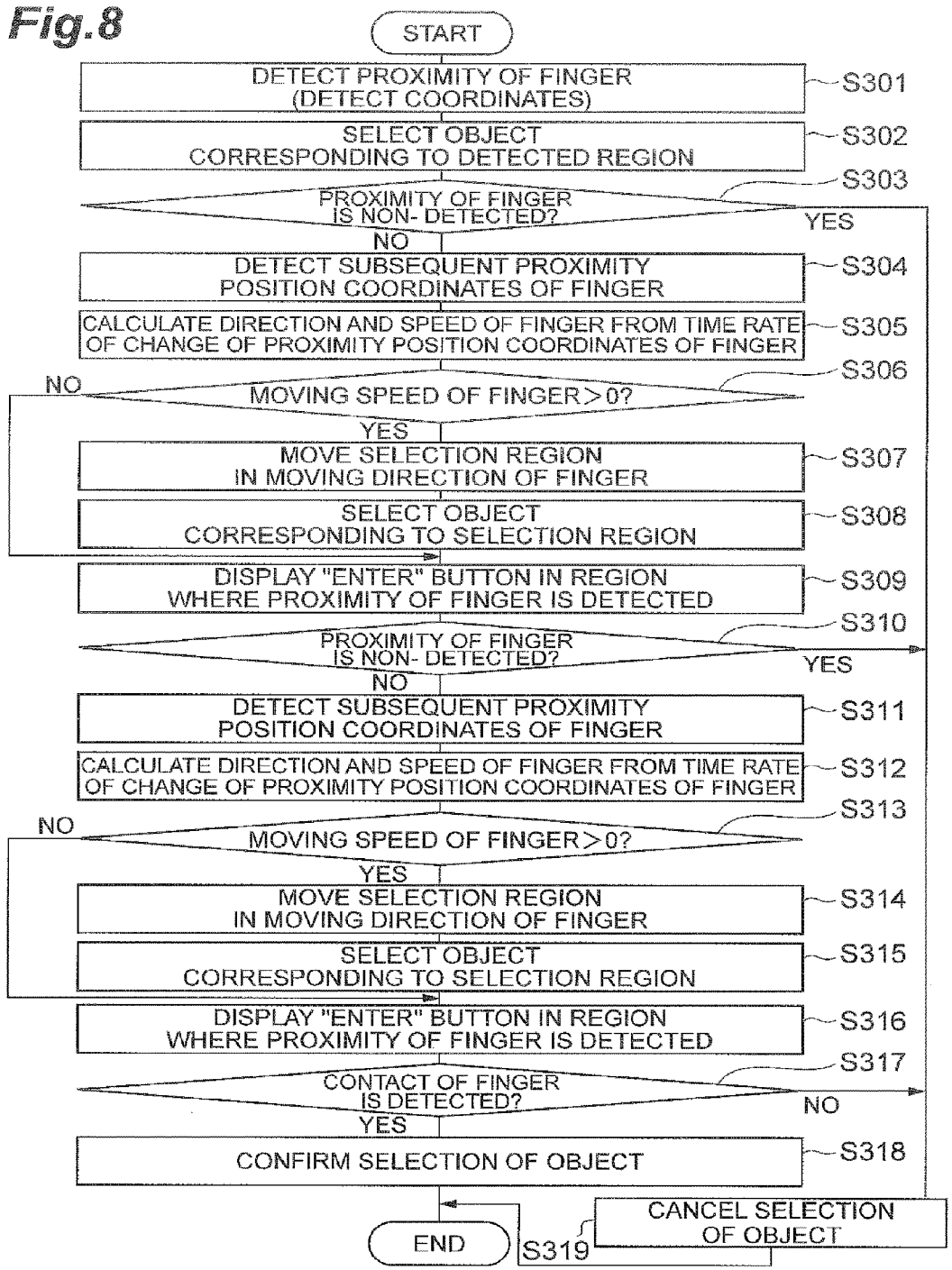

INFORMATION PROCESSING DEVICE AND INFORMATION PROCESSING METHOD

TECHNICAL FIELD

The present invention relates to an information processing device and an information processing method.

BACKGROUND ART

In smartphones and tablets, an operation on a display with touch panel (which is referred to hereinafter as "touch panel display") is the mainstream today. As a user interface using the touch panel display, a technique that assists a user's operation based on whether an object such as a user's finger or a pen is in proximity to the touch panel display by a specified distance or less is disclosed (for example, see Literatures 1 and 2 below). In the technique disclosed in Patent Literature 1, when proximity of an object is detected on the touch panel display, selection and non-selection of an object are switched according to a detection region. In the technique disclosed in Patent Literature 2, an approach speed of an object to the touch panel display is calculated and mode of contents to be displayed is switched according to the approach speed, thereby providing a user interface according to a user's touch operation.

CITATION LIST

Patent Literature

PTL 1: Japanese Unexamined Patent Application Publication No. 2010-224663
PTL 2: Japanese Unexamined Patent Application Publication No. 2010-205050

SUMMARY OF INVENTION

Technical Problem

However, because the size of a terminal device such as a tablet and a touch panel display is increasing today, it becomes difficult to perform all operations with one hand in the existing information processing device using the touch panel display. For example, in the case where the size of the touch panel display is large, there is a part of the touch screen display where a finger cannot reach when holding the terminal with one hand, and it is not possible to select the object displayed on the touch panel display with one hand, which causes degradation of user-friendliness.

The present invention has been accomplished in view of the above circumstances, and an object of the present invention is thus to provide an information processing device and an information processing method that allow easy selection of an object on a touch panel display and thereby improve user-friendliness.

Solution to Problem

To solve the above-described problem, an information processing device according to one aspect of the invention includes a touch panel display configured to display an object, a contact state detection means configured to detect a state of proximity or contact of an operating tool on the touch panel display, a coordinate detection means configured to detect proximity position coordinates on a plane of the touch panel display when the state of proximity of the operating tool on the touch panel display is detected by the contact state detection means, and an object selection means configured to calculate a direction of movement and a speed of movement of the proximity position coordinates in a plane direction of the touch panel display based on the proximity position coordinates detected by the coordinate detection means, and select the object displayed at a position corresponding to the direction of movement and the speed of movement.

An information processing method according to one aspect of the invention is an information processing method executed by an information processing device, the method including a contact state detection step of detecting a state of proximity or contact of an operating tool on the touch panel display, a coordinate detection step of detecting proximity position coordinates on a plane of the touch panel display when the state of proximity of the operating tool on the touch panel display is detected in the contact state detection step, and an object selection step of calculating a direction of movement and a speed of movement of the proximity position coordinates in a plane direction of the touch panel display based on the proximity position coordinates detected in the coordinate detection step, and selecting the object displayed at a position corresponding to the direction of movement and the speed of movement.

According to the above aspects, the proximity position coordinates of the operating tool on the touch panel display are detected, and the direction of movement and the speed of movement in the plane direction of the touch panel display are calculated based on the proximity position coordinates, and a desired object at the position corresponding to the calculation result is selected. It is thereby possible to allow easy selection of an object on the touch panel display and improve user-friendliness. Further, because the selection of an object is made by a proximity operation, it is possible to avoid conflict with a contact operation.

Further, in the above-described information processing device, the object selection means may determine a selection region at a position away from the proximity position coordinates in the direction of movement by a distance corresponding to the speed of movement, and select the object in the selection region. In this configuration, the selection region at the position away from the proximity position coordinates in the direction of movement by the distance corresponding to the speed of movement is determined, and an object that is displayed at the position in the selection region is selected. It is thereby possible to allow easy selection of an object on the touch panel display and further improve user-friendliness.

Further, in the above-described information processing device, the object selection means may repeat to move the selection region when detection of movement of the proximity position coordinates is repeated by the coordinate detection means. Thus, even in the case where an appropriate object cannot be selected in one operation, the selection region is repeated to be moved by repeating to move the operating tool on the touch panel display, and the appropriate object can be thereby selected. It is thereby possible to allow easy selection of an object on the touch panel display and further improve user-friendliness.

Further, in the above-described information processing device, the object selection means may cancel the selection of the object when the state of proximity is not detected by the contact state detection means in a state where the object is selected. It is thereby possible to easily cancel the selection of the object and improve user-friendliness at the time of re-selecting of the object.

Further, in the above-described information processing device, the object selection means may confirm the selection when the state of contact of the operating tool on the touch panel display is detected by the contact state detection means in a state where the object is selected. It is thereby possible to easily confirm the selection of the object and improve user-friendliness at the time of confirming the selection of the object.

Advantageous Effects of Invention

According to the present invention, it is possible to provide an information processing device and an information processing method that allow easy selection of an object on a touch panel display and thereby improve user-friendliness.

BRIEF DESCRIPTION OF DRAWINGS

FIG. 3 is a diagram showing one example of a data structure of proximity position coordinates information stored in a coordinate information storage unit in FIG. 1.

FIG. 4 is a diagram showing one example of a data structure of object information stored in an object information storage unit in FIG. 1.

FIG. 7 is a flowchart showing one example of an operation of repeating selection of an object by the information processing device in FIG. 1.

FIG. 8 is a flowchart where an operation of displaying an enter button on the touch panel display is added to FIG. 7.

DESCRIPTION OF EMBODIMENTS

A preferred embodiment of the present invention will be described hereinafter in detail with reference to the attached drawings. It is noted that, in the description of the drawings, the same elements will be denoted by the same reference symbols and redundant description will be omitted.

Figure 1:
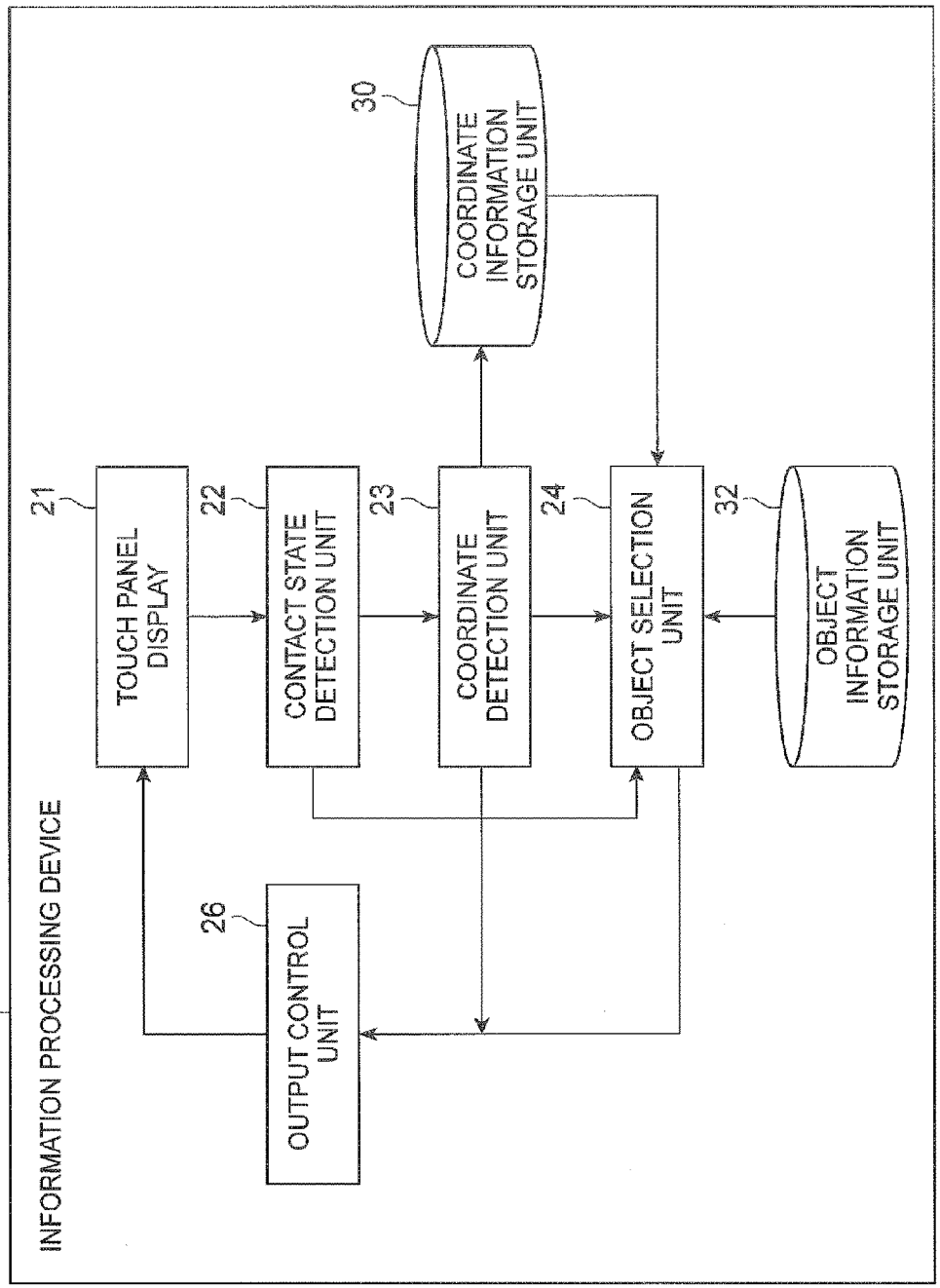
FIG. 1 is a schematic diagram of an information processing device according to one embodiment of the present invention.

FIG. 1 is a schematic diagram of an information processing device according to one embodiment of the present invention. The information processing device 1 is a mobile information processing terminal device that can connect to a mobile communication network or a wireless LAN (Local Area Network), such as a smartphone, a tablet terminal and a mobile phone terminal.

As shown in FIG. 1, the information processing device 1 includes a so-called touch panel display 21 as an output device for displaying information, and includes a contact state detection unit 22, a coordinate detection unit 23, an object selection unit 24, an output control unit 26, a coordinate information storage unit 30, and an object information storage unit 32 as functional elements. The functions of each of the elements are described hereinafter in detail.

The touch panel display 21 of the information processing device 1 is an input/output device that displays images such as a menu screen, icon images, photographs and documents and receives an information input operation by detecting proximity or contact of an operating tool. Although the touch panel display 21 detects proximity or contact of a user's finger as an operating tool in this embodiment, it may be configured to be able to detect proximity or contact of a stylus pen as an operating tool. Further, the touch panel display 21 is configured to be able to detect a proximity distance between a user's finger and the screen of the touch panel display 21. For example, the touch panel display 21 is a capacitive touch panel display and configured to be able to calculate a distance (proximity distance) between the screen and a finger by detecting the amount of change in capacitance between the finger and a circuit in the touch panel display 21. Alternatively, an optical structure capable of calculating a proximity distance using infrared rays such as In-Cell may be employed as the touch panel display 21.

The contact state detection unit 22 is a contact state detection means that detects the state of proximity or contact of a finger on the touch panel display 21. The contact state detection unit 22 detects whether a finger is in the state of proximity to the touch panel display 21 or in the state of contact with the touch panel display 21. The state of proximity is where a finger 2 is in close proximity to but not in direct contact with the surface of the touch panel display 21 and is several mm away from the surface of the touch panel display 21 in the z-direction (vertical direction). The state of contact is where a finger is in direct contact with the surface of the touch panel display 21. When it is detected by the contact state detection unit 22 that the finger 2 is in the state of proximity to the touch panel display 21, that is output to the coordinate detection unit 23, which is described later. Further, when it is detected by the contact state detection unit 22 that the finger is not in the state of proximity to the touch panel display 21, that is output to the object selection unit 24, which is described later. Furthermore, when it is detected by the contact state detection unit 22 that the finger is in the state of contact with the touch panel display 21, that is output to the coordinate detection unit 23 and the object selection unit 24, which are described later.

Further, the contact state detection unit 22 can calculate a distance between the surface of the touch panel display 21 and the finger 2 (which is hereinafter referred to simply as "proximity distance") by detecting the amount of change in capacitance between the finger and a circuit in the touch panel display 21. Note that the contact state detection unit 22 may calculate the proximity distance using infrared rays. In this case, an in-Cell touch panel display, not a capacitive touch panel display, is used as the touch panel display 21.

The coordinate detection unit 23 is a coordinate detection means that, when a notification indicating that the finger is in the state of proximity is output from the contact state detection unit 22, detects the position coordinates of the proximity. The coordinate detection unit 23 has an x-direction sensor and a y-direction sensor on the xy-plane along the surface of the touch panel display 21. When a finger is in proximity to the touch panel display 21, the coordinate detection unit 23 detects signals output from the x-direction sensor and the y-direction sensor and thereby detects positions on the xy-plane (which are hereinafter referred to simply as "proximity position coordinates (x-coordinate, y-coordinate)") on the touch panel display 21 to which the finger is in proximity. The coordinate detection unit 23 detects the proximity position coordinates (x-coordinate, y-coordinate) at specified time intervals (for example, at intervals of 0.1 second) during the period from t seconds when a notification that the finger is in the state of proximity is started to be output from the contact state detection unit 22 to t+Δ seconds, for example. The time period until the end of detection may be a time period until the proximity of the finger ceases to be detected by the contact state detection unit 22 or may be a predetermined time period. The detected proximity position coordinates (x-coordinate, y-coordinate) are stored into the coordinate information storage unit 30, which is described later. Further, when the detection of the proximity position coordinates (x-coordinate, y-coordinate) ends, the coordinate detection unit 23 outputs a notification indicating the end to the object selection unit 24, which is described later.

Further, when a notification indicating that the finger is in the state of contact is output from the contact state detection unit 22, the coordinate detection unit 23 detects the position coordinates of the contact in the same manner as the above method. After detecting the contact position coordinates, the coordinate detection unit 23 outputs the position coordinates to the object selection unit 24.

Further, when an object in a selection region is not confirmed by the object selection unit 24, which is described later, and when a notification indicating that the finger is in the state of proximity is output from the contact state detection unit 22, the coordinate detection unit 23 detects the proximity position coordinates (x-coordinate, y-coordinate) again. The proximity position coordinates (x-coordinate, y-coordinate) detected by the coordinate detection unit 23 are newly stored into the coordinate information storage unit 30, which is described later. Further, when the detection of the proximity position coordinates (x-coordinate, y-coordinate) ends, the coordinate detection unit 23 outputs a notification indicating the end to the object selection unit 24, which is described later.

The object selection unit 24 is an object selection means that calculates the direction and speed of movement of the proximity position coordinates along the xy-plane direction in parallel with the surface of the touch panel display 21 based on the proximity position coordinates (x-coordinate, y-coordinate) output from the coordinate detection unit 23, and selects an object that is displayed at the position corresponding to the calculated direction and speed. When a notification indicating the end of the detection of the proximity position coordinates (x-coordinate, y-coordinate) is output from the coordinate detection unit 23, the object selection unit 24 calculates the direction and speed of a finger moving along the xy-plane direction in parallel with the surface of the touch panel display 21 based on a time rate of change of the proximity position coordinates (x-coordinate, y-coordinate) stored in the coordinate information storage unit 30, which is described later. To be specific, the object selection unit 24 calculates the direction and speed of a finger moving along the xy-plane direction from a displacement between the position coordinates $(x(t), y(t))$ detected first and the position coordinates $(x(t+\Delta t_1), y(t+\Delta t_1))$ after the lapse of a specified time $\Delta t_1$.

Further, the object selection unit 24 determines a selection region that is at the position away from the currently detected proximity position coordinates (x-coordinate, y-coordinate) in the calculated direction of movement of the finger along the xy-plane direction by a distance corresponding to the calculated speed of movement of the finger along the xy-plane direction. Then, the object selection unit 24 selects an object that is displayed in the selection region as an object in the selection region. As the distance corresponding to the speed of movement of the finger along the xy-plane direction, a distance proportional to the speed can be calculated by multiplying the speed by a predetermined proportionality factor α. Then, by adding the calculated distance to the currently detected proximity position coordinates (x-coordinate, y-coordinate) in the moving direction of the finger, the position coordinates of the given selection region can be obtained. The selection region is a rectangular or circular region or the like with a specified size, and the position coordinates of the selection region are the center position of the selection region, for example. The size of the selection region is equal to a region in which one object is displayed, for example. The object in the selection region can be acquired by pre-storing the position coordinates of the object into the object information storage unit 32, which is described later. After acquiring the object in the selection region, the object selection unit 24 notifies information for specifying the object to the output control unit 26, which is described later, in order to perform various output controls on the object in the selection region.

Further, the object selection unit 24 repeats to move the selection region when the detection of movement of the proximity position coordinates is repeated by the coordinate detection unit 23. For example, in the case where selection of an object is made and the selection is not confirmed by the object selection unit 24, when the state of proximity is detected again by the contact state detection unit 22, the object selection unit 24 calculates the direction and speed of the finger moving along the xy-plane direction again. The calculation is based on a time rate of change of the proximity position coordinates (x-coordinate, y-coordinate) newly stored by the coordinate detection unit 23. Based on the calculated moving direction and speed of the finger, the object selection unit 24 moves the selection region again to the position away from the current selection region in the moving direction and selects an object at the position in the selection region after movement again as an object in the selection region. After acquiring the object in the selection region, the object selection unit 24 notifies information for specifying the object to the output control unit 26, which is described later, in order to perform various output controls on the object in the selection region.

Further, in the case where a notification that the state of proximity is not detected is output from the contact state detection unit 22 when the object selection unit 24 is selecting the object, the object selection unit 24 cancels the selection of the object. In this case, the object selection unit 24 outputs a notification about the cancel of the selection of the object to the output control unit 26.

Further, in the case where a notification that the state of contact is detected is output from the contact state detection unit 22 when the object selection unit 24 is selecting the object, the object selection unit 24 confirms the selection of the object. In this case, the object selection unit 24 outputs a notification about the confirmation of the selection of the object to the output control unit 26.

The coordinate information storage unit 30 stores the proximity position coordinates (x-coordinate, y-coordinate) output from the coordinate detection unit 23. FIG. 3 is a diagram showing one example of the data structure of the proximity position coordinate information stored in the coordinate information storage unit shown in FIG. 1. As shown in FIG. 3, the proximity position coordinates $(x(t), y(t))$ at time t to the position coordinates $(x(t+p), y(t+p))$ at time t+p (where p=0.1, 0.2, . . . , Δt) are sequentially stored in the coordinate information storage unit 30. The proximity position coordinates (x-coordinate, y-coordinate) stored in the coordinate information storage unit 30 are read by the object selection unit 24.

The object information storage unit 32 stores the position coordinates of each object. FIG. 4 is a diagram showing one example of the data structure of the object information stored in the object information storage unit in FIG. 1. As shown in FIG. 4, the position coordinates (xi, yi) (where i=1, 2, . . . , n) and objects A, B, . . . , G corresponding thereto are stored in association in the object information storage unit 32. The position coordinates of the objects A, B, . . . , G stored in association in the object information storage unit 32 are read by the object selection unit 24.

Figure 2:
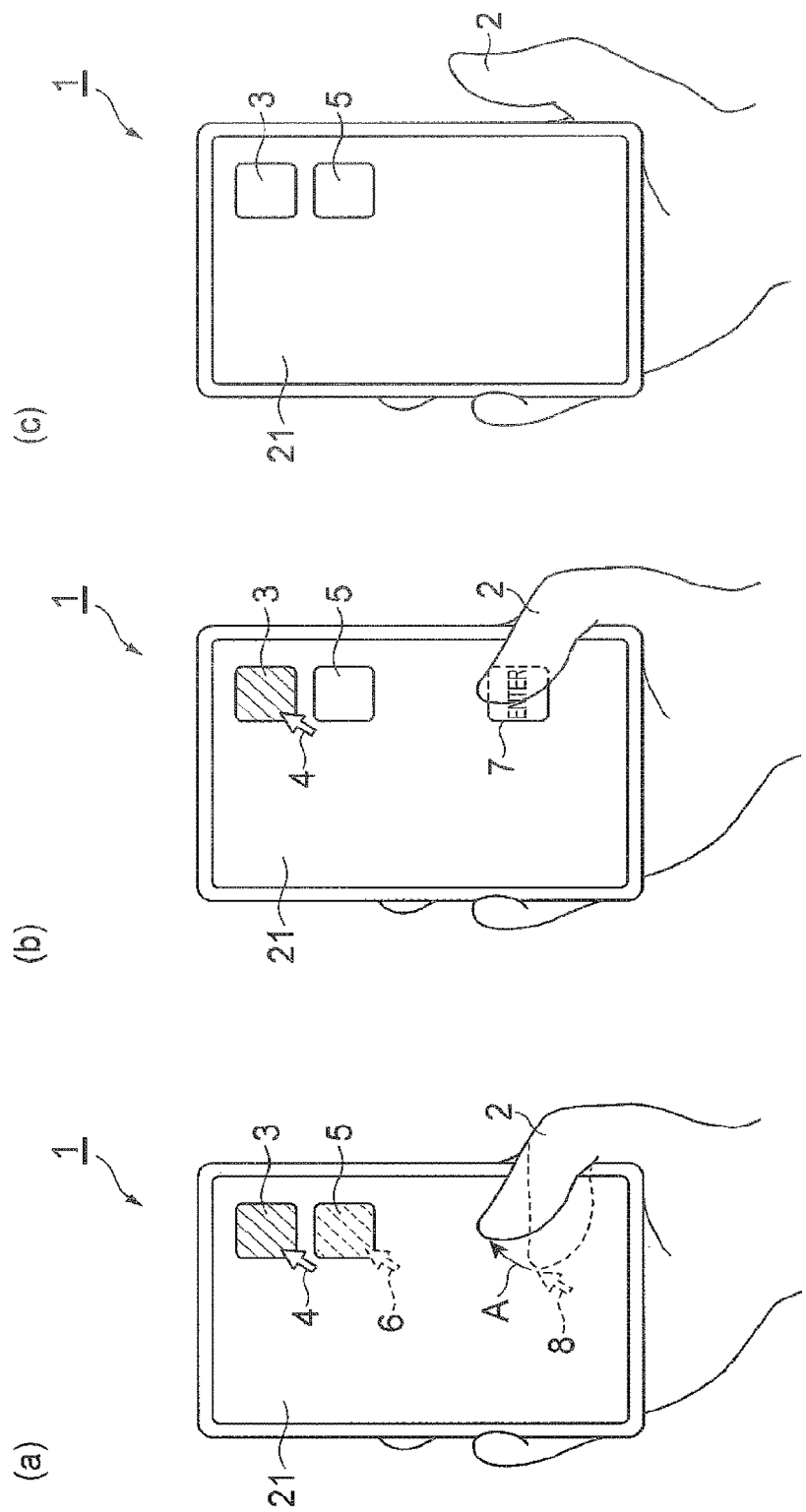
FIG. 2 is a diagram showing an output example of an object in a selection region on a touch panel display in FIG. 1.

The output control unit 26 performs various output controls on the object in the selection region determined by the object selection unit 24. FIG. 2 is a diagram showing an output example of the object in the selection region on the touch panel display in FIG. 1. As shown in FIG. 1(*a*), when an object 3 in the selection region calculated by the object selection unit 24 is selected, the object 3 is highlighted and indicated by a pointer 4. Note that the display of the object 3 in the selection region is not limited to the highlight or the use of the pointer 4, and the color of the object 3 in the selection region may be inverted or a symbol or graphic other than the pointer 4 may be used, for example.

Further, as shown in FIG. 2(*b*), the output control unit 26 displays an enter button 7 for confirming the object 3 in the selection region selected by the object selection unit 24 at the position where the proximity of the finger 2 is detected by the coordinate detection unit 23. Further, as shown in FIG. 2(*c*), when the proximity of the finger 2 to the touch panel display 21 ceases to be detected by the contact state detection unit 22, the output control unit 26 cancels the highlight of the object 3 in the selection region. Specifically, the object 3 in the selection region ceases to be highlighted, and the pointer 4 ceases to be displayed, thereby canceling the selection of the object. Further, when a notification indicating the confirmation of the object 3 in the selection region is output from the object selection unit 24, the output control unit 26 makes various outputs indicating that the object 3 in the selection region is confirmed. Further, when the position where the contact of the finger 2 is detected is output from the coordinate detection unit 23, the output control unit 26 makes various outputs indicating the confirmation at the contact position. For example, it makes an output for starting an application indicated by the confirmed object.

Figure 5:
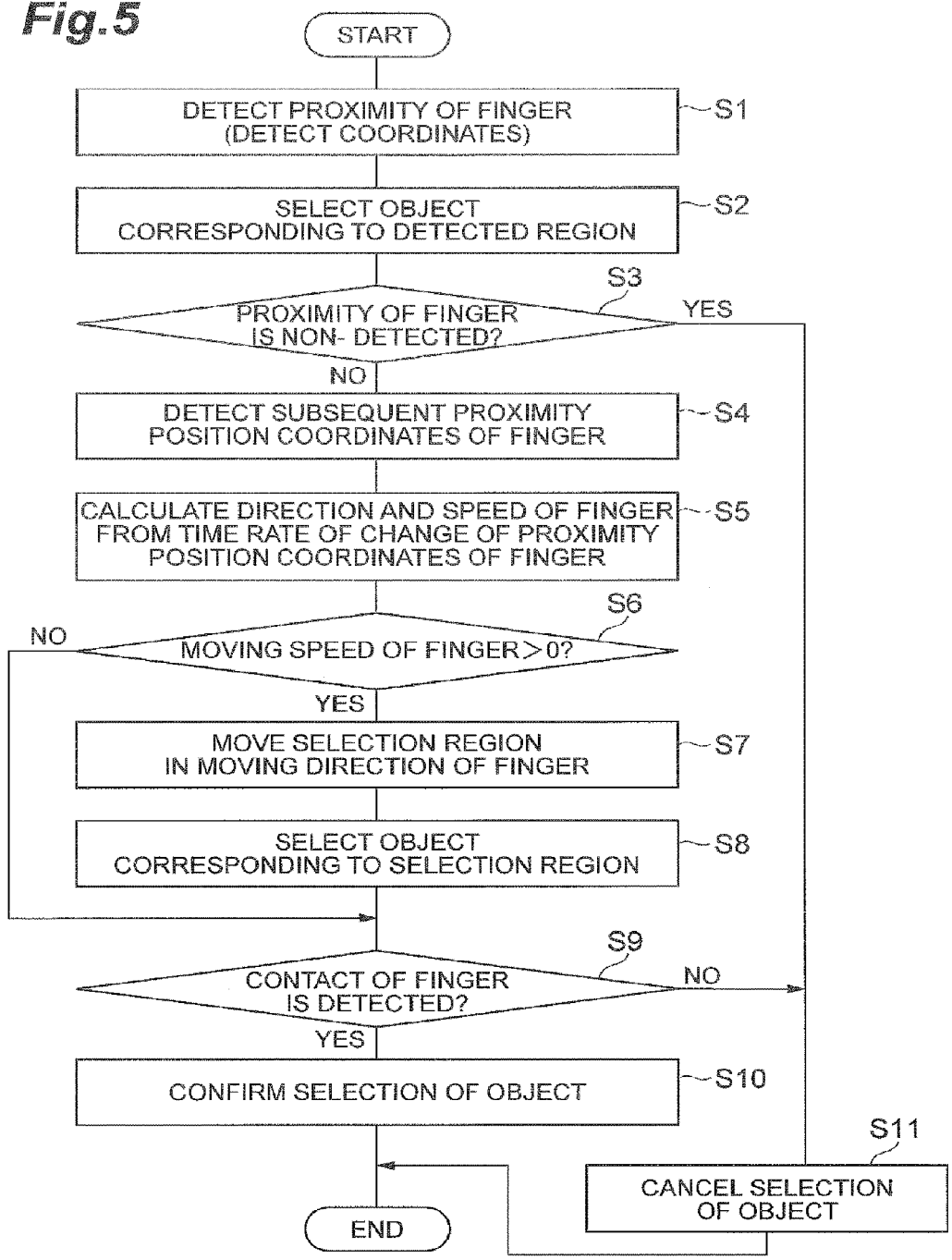
FIG. 5 is a flowchart showing one example of an operation of selecting an object by the information processing device in FIG. 1.
Figure 6:
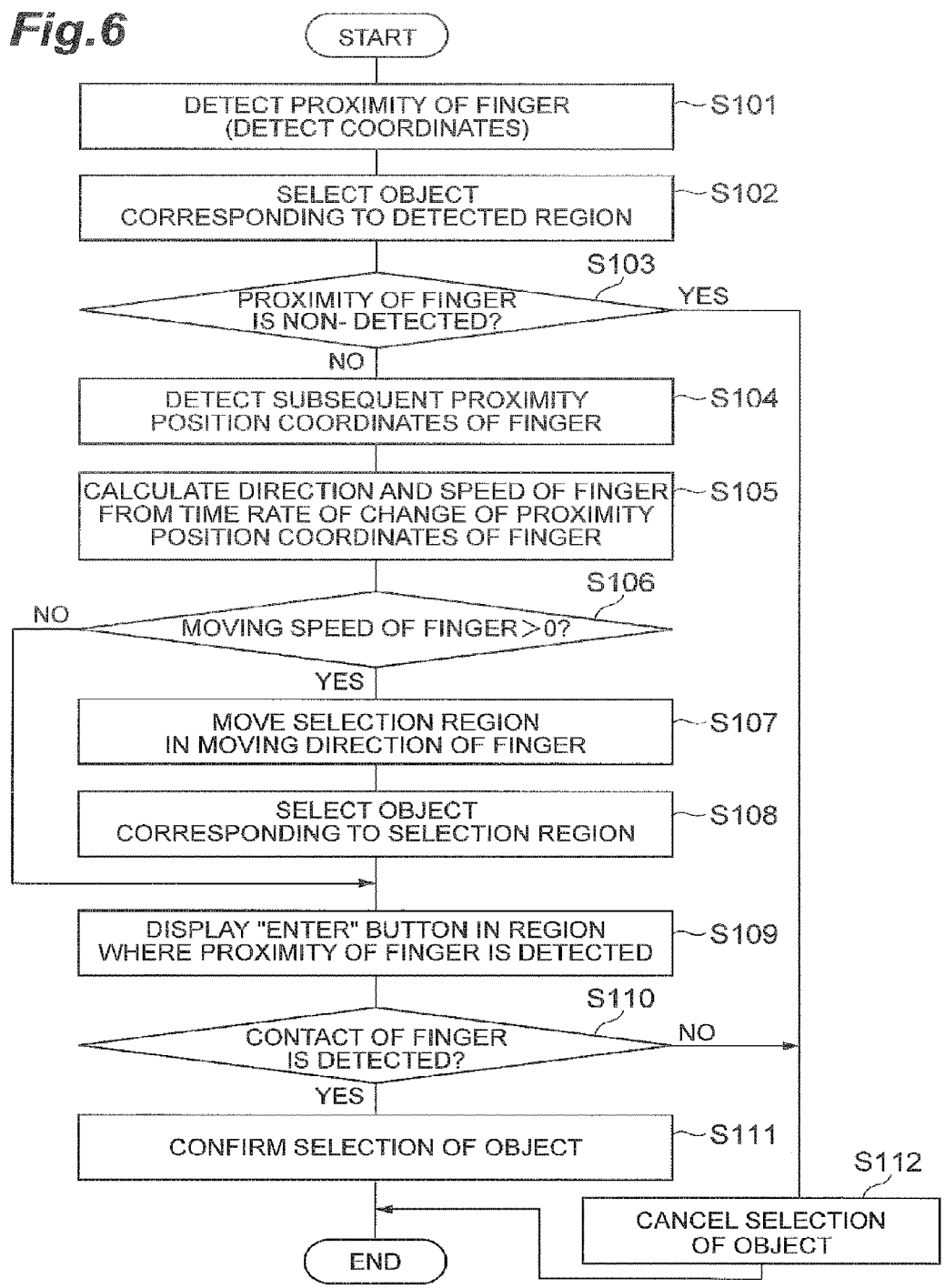
FIG. 6 is a flowchart where an operation of displaying an enter button on the touch panel display is added to FIG. 5.

An operation of an information processing method executed using the information processing device 1 is described hereinafter with reference to FIGS. 5 to 8. FIG. 5 is a flowchart showing one example of an operation of selecting an object by the information processing device in FIG. 1, FIG. 6 is a flowchart where an operation of displaying an enter button on the touch panel display is added to FIG. 5, FIG. 7 is a flowchart showing one example of an operation of repeating selection of an object by the information processing device in FIG. 1, and FIG. 8 is a flowchart where an operation of displaying an enter button on the touch panel display is added to FIG. 7.

The operation of selecting an object by the information processing device 1 in FIG. 1 is described first with reference to FIG. 5. When a user brings the finger 2 into close proximity to the touch panel display 2, the proximity of the finger 2 is detected by the contact state detection unit 22, and the proximity position coordinates (x-coordinate, y-coordinate) of the finger 2 are detected by the coordinate detection unit 23 (S1). After the proximity position coordinates (x-coordinate, y-coordinate) of the finger 2 are detected, the object corresponding to the position coordinates (x-coordinate, y-coordinate) is selected (S2). Because the object at the position where the user's finger 2 is in proximity is selected, a pointer 8 is displayed at the proximity position of the finger 2 on the touch panel display 21 (see FIG. 2(*a*)).

Then, it is determined by the coordinate detection unit 23 whether the proximity of the finger 2 to the touch panel display 21 is non-detected or not in the state where the object at the position where the user's finger 2 is in proximity is selected (S3: contact state detection step). When it is determined by the coordinate detection unit 23 that the proximity of the finger 2 is non-detected (YES in S3), the selection of the object is cancelled (S11). On the other hand, when it is determined by the coordinate detection unit 23 that the proximity of the finger 2 is not non-detected (NO in S3), the subsequent proximity position coordinates (x-coordinate, y-coordinate) of the finger are detected at intervals of 0.1 second during the period of t to t+Δt seconds (S4: coordinates detection step).

Then, the moving direction and speed of the finger 2 in proximity are calculated by the object selection unit 24 based on a time rate of change of the proximity position coordinates (x-coordinate, y-coordinate) of the finger 2 (S5: object selection step). It is then determined whether the moving speed of the finger 2 is more than 0 or not (S6). When it is determined that the moving speed of the finger 2 is equal to or less than 0 (NO in S6), a region where an object is selected remains at the position in Step S2, and the process proceeds to Step S9.

On the other hand, when it is determined that the moving speed of the finger 2 is more than 0 (YES in S6), a selection region where an object is selected is moved in the moving direction of the finger 2 by the distance corresponding to the moving speed by the object selection unit 24 (S7: object selection step). Then, an object in the selection region is selected by the object selection unit 24 (S8: object selection step). To be specific, as shown in FIG. 2(*a*), when the finger 2 is moved in the direction of the arrow A in the state where the finger 2 is in close proximity to the touch panel display 21, the pointer 8 displayed at the proximity position of the finger 2 moves in the direction of the arrow A by the distance corresponding to the speed at which the finger 2 has moved. Accordingly, the position of the object in the selection region indicated by the pointer changes depending on the speed of moving the finger 2. Specifically, because the object 3 is at the position farther away from the proximity position coordinates (x-coordinate, y-coordinate) of the finger 2 compared with the object 5, the object 3 can be selected by moving the finger at a higher speed than when selecting the object 5. The selected object 3 is highlighted, for example, and the pointer 4 is displayed at the position indicating the object 3.

After that, it is determined by the contact state detection unit 22 whether the contact of the finger 2 is detected or not (S9: contact state detection step). When it is determined that the contact of the finger 2 is not detected (NO in S9), the selection of the object 3 is cancelled (S11: object selection step), and the highlight of the object 3 and the pointer 4 indicating the object 3 cease to be displayed. To be specific, as shown in FIG. 2(*c*), when the finger 2 comes away from the touch panel display 21 so that the proximity to the touch panel display 21 cannot be detected in the state of selecting the object 3, the object selection unit 24 cancels the selection of the object 3. On the other hand, when the user touches the surface of the touch panel display 21 in the proximity position of the finger 2, it is determined by the contact state detection unit 22 that the contact of the finger 2 is detected (YES in S9), and the selection of the object 3 is confirmed by the object selection unit 24 (S10: object selection step).

The operation of selecting an object by the information processing device 1 thereby ends.

The operation of displaying an enter button on the touch panel display 21 is described with reference to FIG. 6. The operation shown in FIG. 6 is different from the above-described operation of selecting an object by the information processing device 1 of FIG. 1 shown in FIG. 5 in that the enter button 7 is displayed on the touch panel display 21 in Step S109. To be specific, the enter button 7 is displayed at the proximity position of the finger 2 on the touch panel display 21 as shown in FIG. 2(*b*), and when the user touches the enter button with the finger 2, a notification indicating the detection of the state of contact is output from the contact state detection unit 22, and the selection of the object 3 is confirmed by the object selection unit 24 (S111: object selection step).

The operation of repeating selection of an object by the information processing device 1 of FIG. 1 is described hereinafter with reference to FIG. 7. The operation shown in FIG. 7 is different from the above-described operation of selecting an object by the information processing device 1 of FIG. 1 shown in FIG. 5 in that the operations in Steps S203 to S208 are performed again in Steps S209 to S214. In this manner, by repeating the operations from detecting the proximity of the finger 2 to selecting the object, it is possible to select the object that is displayed at the position away from the currently detected proximity position coordinates. To be specific, when the object selected by the object selection unit 24 is the object 5 shown in FIG. 2(*a*), the operations from detecting the proximity of the finger 2 to selecting the object are performed again in the following Steps S209 to S214, and thereby the object 3 at the position farther away from the proximity position of the finger 2 than the object 5, for example, is selected, and the pointer 4 indicating the object 3 is displayed. Accordingly, by repeating the movement of the finger 2, the user can select the object 3 located at the position farther away from the proximity position coordinates (x-coordinate, y-coordinate) of the finger 2 than the object 5.

The operation of displaying an enter button on the touch panel display 21 is described with reference to FIG. 8. The operation shown in FIG. 8 is different from the above-described operation of repeating selection of an object by the information processing device 1 of FIG. 1 shown in FIG. 7 in that the enter button 7 is displayed on the touch panel display 21 in Steps S309 and S316. To be specific, the enter button 7 is displayed at the proximity position of the finger 2 on the touch panel display 21 as shown in FIG. 2(*b*), and when the user touches the enter button with the finger 2, a notification indicating the detection of the state of contact is output from the contact state detection unit 22, and the selection of the object 3 is confirmed by the object selection unit 24 (S318: object selection step).

According to the information processing device 1 described above, when the proximity state of the finger 2 to the touch panel display 21 is detected by the contact state detection unit 22, the proximity position coordinates are detected by the object selection unit 24, and the direction of moving along the plane of the touch panel display 21 and the speed of moving along the plane of the touch panel display 21 are calculated on the basis of the proximity position coordinates, and the object at the position corresponding to the calculation result is selected. It is therefore effective in the case where there is an object which the finger 2 cannot reach on the touch panel display 21 when handling the information processing device 1 with one hand, for example. Specifically, a user can easily select the object in the range where the finger 2 cannot reach with one hand by changing the moving direction and speed of the finger 2 in the plane direction of the touch panel display 21. It is thereby possible to select a desired object according to the moving direction and the moving speed of the finger 2 on the touch panel display 21 and thus allow easy selection of an object on the touch panel display 21 and improve user-friendliness. Further, because the selection of an object is made by a proximity operation, the object, which is not visible behind an operating tool in the case of the contact operation, is visible. Further, because the object can be selected without directly touching the touch panel display, it is more sanitary compared with the case of the direct operation. Furthermore, it is possible to avoid conflict with a contact operation (for example, scrolling) that has been often used.

Further, the object selection unit 24 determines the selection region at the position away from the proximity position coordinates in the moving direction by the distance corresponding to the moving speed and selects an object located in the selection region. A range where the finger 2 cannot reach on the touch panel display 21, for example, is thereby determined as the selection region, and an object in the range where the finger 2 cannot reach can be thereby selected easily. It is thereby possible to allow easy selection of an object on the touch panel display and further improve user-friendliness.

Further, when the detection of movement of the proximity position coordinates is repeated by the coordinate detection unit 23, the object selection unit 24 repeats to move the selection region. Thus, even when there is an object in the range where the finger 2 cannot reach on the touch panel display 21 when handling the information processing device 1 with one hand, for example, by repeating to move the finger 2 in the plane direction of the touch panel display 21, the detection of movement of the proximity position coordinates is repeated by the coordinate detection unit 23, and the selection region is moved again. It is thereby possible to select an object in the range where the finger 2 cannot reach with one hand. Thus, even in the case where an appropriate object cannot be selected in one operation, the appropriate object can be selected by repeating to move the finger 2 on the touch panel display 21, and it is thereby possible to allow easy selection of an object on the touch panel display 21 and further improve user-friendliness.

Further, when the proximity state of the finger 2 is not detected by the contact state detection unit 22 in the state where the object is selected by the object selection unit 24, the selection of the object is cancelled. Therefore, when canceling the selection of the object in the range where the finger 2 cannot reach on the touch panel display 21 while handling the information processing device 1 with one hand, for example, it is possible to cancel the selection of the object in the range where the finger 2 cannot reach with one hand. It is thereby possible to easily cancel the selection of the object and improve user-friendliness at the time of re-selecting of the object.

Further, when the state of contact of the finger 2 with the touch panel display 21 is detected by the contact state detection unit 22 in the state where the object is selected by the object selection unit 24, the selection of the object is confirmed. Therefore, when confirming the selection of the object in the range where the finger 2 cannot reach on the touch panel display 21 while handling the information processing device 1 with one hand, for example, it is possible to confirm the selection of the object in the range where the finger 2 cannot reach with one hand. It is thereby possible to easily confirm the selection of the object and improve user-friendliness at the time of confirming the selection of the object.

Although a preferred embodiment of the present invention has been described above, the present invention is not limited to the above-described embodiment, and various changes and modifications may be made without departing from the scope of the invention.

For example, although the distance corresponding to the moving speed of the finger 2 in the xy-plane direction is calculated by multiplying the speed by a predetermined proportionality factor α, for example, in the above-described embodiment, it is not limited thereto. For example, the distance may be calculated by pre-storing the moving speed in the xy-plane direction and the distance corresponding thereto in a memory and reading this information.

Further, an output for an object in the selection region is not limited to that described in the above embodiment. For example, an object in the selection region may be notified to a user by vibration, sound or the like.

Further, although the object information storage unit 32 stores the position coordinates of each object in the above-described embodiment, it is not limited thereto. For example, a specified range where each object is assumed to be located may be stored.

Further, although the selection region is a rectangular or circular region or the like with a specified size in the above-described embodiment, it is not limited thereto, and the selection region may be in various shapes.

INDUSTRIAL APPLICABILITY

The present invention is applied to an information processing device and an information processing method, and it is possible to allow easy selection of an object on a touch panel display and improve user-friendliness.

REFERENCE SIGNS LIST

1 . . . information processing device, 2 . . . finger (operating tool), 3,5 . . . object, 21 . . . touch panel display, 22 . . . contact state detection unit (contact state detection means), 23 . . . coordinate detection unit (coordinate detection means), 24 . . . object selection unit (object selection means)

The invention claimed is:

1. An information processing device comprising:
a touch panel display configured to display an object; and
circuitry configured to
detect a state of proximity or contact of an operating tool on the touch panel display,
detect proximity position coordinates on a plane of the touch panel display when the state of proximity of the operating tool on the touch panel display is detected,
calculate a direction of movement and a speed of movement of the proximity position coordinates in a plane direction of the touch panel display based on the proximity position coordinates detected;
determine a selection region at a position away from the proximity position coordinates in the direction of movement by a distance corresponding to the speed of movement;
select the object displayed in the selection region;
control the touch panel display to display an icon at a position at which the proximity coordinates are detected; and
confirm the selection of the object when an input of the operating tool is detected at the position at which the icon is displayed.

2. The information processing device according to claim 1, wherein
the circuitry is configured to repeat to move the selection region when detection of movement of the proximity position coordinates is repeated.

3. The information processing device according to claim 1, wherein
the circuitry is configured to cancel the selection of the object when the state of proximity is not detected in a state where the object is selected.

4. The information processing device according to claim 1, wherein
the circuitry is configured to confirm the selection when the state of contact of the operating tool on the touch panel display is detected in a state where the object is selected.

5. The information processing device according to claim 1, wherein
the circuitry is configured to cancel the selection of the object when the state of proximity is not detected in a state where the object is selected.

6. The information processing device according to claim 2, wherein
the circuitry is configured to cancel the selection of the object when the state of proximity is not detected in a state where the object is selected.

7. An information processing method executed by an information processing device having a touch panel display for displaying an object, the method comprising:
detecting a state of proximity or contact of an operating tool on the touch panel display;
detecting proximity position coordinates on a plane of the touch panel display when the state of proximity of the operating tool on the touch panel display is detected in the contact state detection;
calculating a direction of movement and a speed of movement of the proximity position coordinates in a plane direction of the touch panel display based on the proximity position coordinates detected in the coordinate detection;
determine a selection region at a position away from the proximity position coordinates in the direction of movement by a distance corresponding to the speed of movement;
selecting the object displayed at a position in the selection region;
displaying an icon on the touch panel display a position at which the proximity coordinates are detected; and
confirming the selection of the object when an input of the operating tool is detected at the position at which the icon is displayed.

8. The information processing device according to claim 1, wherein the circuitry is configured to:
calculate the speed of movement based on a distance of the movement over a predetermined period of time; and
calculate the distance corresponding to the speed of movement by applying a coefficient corresponding to the speed of movement to the distance of movement.

9. The information processing method according to claim 7, further comprising:
calculating the speed of movement based on a distance of the movement over a predetermined period of time; and calculating the distance corresponding to the speed of movement by applying a coefficient corresponding to the speed of movement to the distance of movement.

\* \* \* \* \*